United States Patent [19]

Nobuta et al.

[11] Patent Number: 5,323,439

[45] Date of Patent: Jun. 21, 1994

[54] X-RAY COMPUTERIZED TOMOGRAPHIC IMAGE DATA ACQUISITION CIRCUITRY CAPABLE OF PERFORMING HIGH-SPEED DATA ACQUISITION

[75] Inventors: Yasuo Nobuta, Ishibayashi; Koichi Muraki, Ootawarashi, both of Japan

[73] Assignee: Kabushiki Kaisha Toshiba, Kanagawa, Japan

[21] Appl. No.: 831,912

[22] Filed: Feb. 6, 1992

[30] Foreign Application Priority Data

Feb. 7, 1991 [JP] Japan .................................. 3-015619

[51] Int. Cl.⁵ .............................................. A61B 6/00
[52] U.S. Cl. .......................................... 378/19; 378/4; 378/15; 378/98
[58] Field of Search .................... 378/4, 19, 116, 901, 378/99, 15, 91, 98; 364/413.14, 413.15, 413.19

[56] References Cited

U.S. PATENT DOCUMENTS

| | | | |
|---|---|---|---|
| 4,070,707 | 1/1978 | Barber | 364/414 |
| 4,158,138 | 6/1979 | Hellstorm | 378/116 |
| 4,160,911 | 7/1979 | Hounsfield | 250/445 |
| 4,450,465 | 5/1984 | Pimbley et al. | 357/30 |
| 4,454,423 | 6/1984 | Koob | 250/374 |
| 4,734,588 | 3/1988 | Akai | 250/370 |
| 4,769,827 | 9/1988 | Uno et al. | 378/19 |
| 4,887,211 | 12/1989 | Thiel et al. | 378/901 |
| 4,969,095 | 11/1990 | Pauzat et al. | 378/901 |
| 4,969,166 | 11/1990 | Hahn | 378/4 |
| 4,982,095 | 1/1991 | Takahashi et al. | 250/367 |
| 5,018,173 | 5/1991 | Komai et al. | 378/4 |

FOREIGN PATENT DOCUMENTS

| | | |
|---|---|---|
| 0058230A1 | 8/1982 | European Pat. Off. |
| 0213213A1 | 3/1987 | European Pat. Off. |
| 0444869A3 | 9/1991 | European Pat. Off. |
| 2191438 | 7/1990 | Japan |
| WO91/01532 | 2/1991 | PCT Int'l Appl. |

OTHER PUBLICATIONS

Patent Abstracts of Japan, corresponding to Publication No. JP59066224, entitled "Integrating Type Analog-Digital and Digital-Analogconverter", Aug. 9, 1988.
Patent Abstracts of Japan, corresponding to Publication No. JP63198890, entitled "X-Ray Detecting Device", Aug. 17, 1988.
B. Gordon, "Data Acquisition Systems," printed in Newton and Potts, Technical Aspects of Computed Tomography, the C. V. Mosby Co., 1981, vol. 5, Chapter 119, pp. 4133-4158.
Patent Abstracts of Japan, vol. 7, No. 35 (P-175) (1180), Feb. 10, 1983, corresponding to JP-A-57187678 (Hitachi Medeiko K.K.).
Patent Abstracts of Japan, vol. 14, No. 466 (C-768), Oct. 11, 1990, corresponding to JP-A-2191438 (Toshiba Corp.).
T. H. Newton et al., "Radiology of the Skull and Brain, Technical Aspects of Computed Tomography," vol. 5, the C. V. Mosby Co., 1981, p. 4152, FIG. 119-21.

*Primary Examiner*—David P. Porta
*Assistant Examiner*—Kim-Kwok Chu
*Attorney, Agent, or Firm*—Finnegan, Henderson, Farabow, Garrett & Dunner

[57] ABSTRACT

In an X-ray CT (computerized tomographic) imaging system, a plurality of X-ray detectors, data acquisition circuitry and an image reconstruction unit are provided. The data acquisition circuitry includes a plurality of A/D converter units. The X-ray image signals derived from the plurality of X-ray detectors are A/D-converted by the corresponding ones of the A/D converter units into corresponding X-ray image data. Then, the X-ray image data obtained from the respective A/D converter units is sequentially transferred via a digital data bus to the image reconstruction unit.

19 Claims, 10 Drawing Sheets

PRIOR ART
FIG. 1

PRIOR ART

FIG. 6A X-RAY SIGNAL CURRENT "$i_{s1}$"

FIG. 6B SWITCH "$SW_1$"

FIG. 6C SIGNAL VOLTAGE "$V_{s1}$"

FIG. 6D A/D CONVERSION "$ADC\ 22_1$"

FIG. 6E DATA ON DATA BUS 24

X-RAY COMPUTERIZED TOMOGRAPHIC IMAGE DATA ACQUISITION CIRCUITRY CAPABLE OF PERFORMING HIGH-SPEED DATA ACQUISITION

BACKGROUND OF THE INVENTION

1. Field of the Invention

The present invention generally relates to an X-ray computerized tomographic imaging apparatus. More specifically, the present invention is directed to X-ray CT imaging data acquisition circuitry with employment of a digital data bus.

2. Description of the Prior Art

Figure 1:
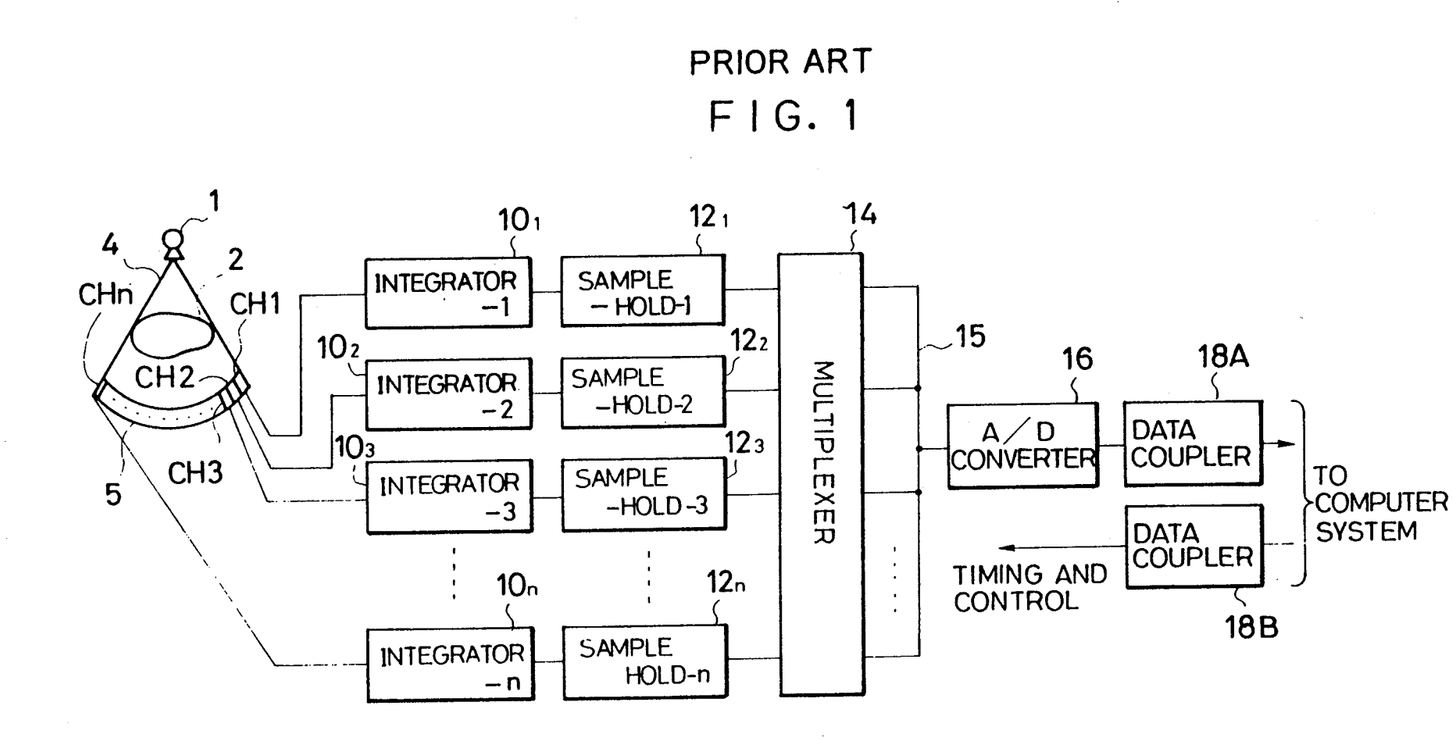
FIG. 1 is a schematic block diagram of a conventional X-ray CT imaging system.

In a typical X-ray CT (computerized tomographic) imaging system, as partially shown in FIG. 1, a large number of X-ray detectors $CH_1$ to $CH_n$ ("n" being an integer) are arranged around a biological body 2 under medical examination so as to detect fan-shaped X-rays 4 penetrated through the biological body 2. These X-rays 4 are emitted from an X-ray tube 1. These X-ray detectors $CH_1$ to $CH_n$ constitute an X-ray detecting unit 5.

X-ray signals derived from the respective X-ray detectors $CH_1$ to $CH_n$ are integrated by corresponding integrators $10_1$ to $10_n$, and thereafter the integrated X-ray signals are held by corresponding sample-holds $12_1$ to $12_n$. Then, the integrated X-ray signals are supplied to a multiplexer 14. As a result, for instance, the integrated X-ray signal derived from the first X-ray detecting channel (detector $CH_1$) is outputted from the multiplexer 14 to an A/D converter 16 via an analog data bus (signal channels) 15. Subsequently, the digital X-ray signal (data) is supplied via a data coupler 18A to a computer system (not shown in detail) in which image reconstruction and other data processing are carried out so as to obtain X-ray CT image data of a slice of the biological body 2.

Similarly, the X-ray signals are supplied by the multiplexer 14, via the analog data bus 15 and A/D converter 16, to the computer system in order to similarly acquire X-ray CT image data of the slice by way of the image reconstruction technique.

The above described X-ray CT imaging system is known in the medical electronics field from, for instance, Japanese patent Disclosure (KOKAI) Application No. 2-191438 (opened on Jul. 27, 1990) filed by Toshiba corporation, and also "Radiology of the skull and brain TECHNICAL ASPECTS OF COMPUTED TOMOGRAPHY" page 4152, FIG. 119-21, volume 5, 1981, by T. H. Newton and G. D. Potts, the C. V. Mosby Company, LONDON.

Figure 2:
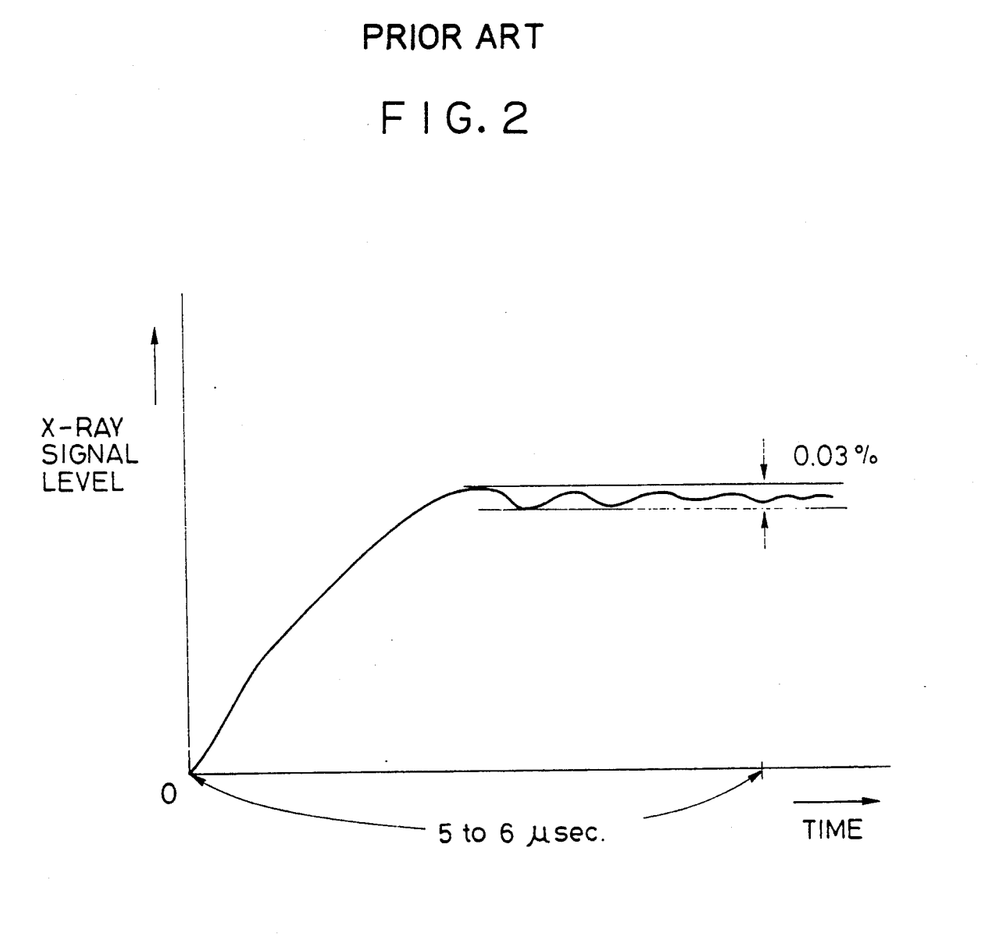
FIG. 2 is a waveform chart of one X-ray image signal illustrating a long transition phenomenon.

As previously described, the multiplexer 14 multiplexes the respective X-ray signal detector/processing channels $CH_1$–$CH_n$; $10_1$–$10_n$ and $12_1$–$12_n$ so as to sequentially furnish the respective X-ray signals, via the A/D converter 16 and the data coupler 18A, to the computer system. When, for instance, the multiplexer 14 is operated to receive the X-ray image signal from the first X-ray signal detector/processing channel $CH_1$, $10_1$ and $12_1$, and then to supply thermal image X-ray signal to the A/D converter 16. As ready seen from a waveform diagram of FIG. 2, such a switching operation may cause a "long transition phenomenon". To obtain the first X-ray image signal in a stable condition, it will normally take a time period of 5 to 6 microseconds, which impedes high speed X-ray image data acquisition.

On the other hand, it is known in the art that the packaging density of X-ray detectors should be increased in order to realize a multislice or volume type X-ray CT system. Accordingly, a total image data acquisition time period of this multislice type X-ray CT system is prolonged, as compared with the normal X-ray CT system, due to the above-explained long transition time.

Furthermore, since the analog signal data bus 15 is employed between the output of the multiplexer 14 and the input of the A/D converter 16, noises may be induced into the X-ray image signals transferred from the multiplexer 14 to the A/D converter 16, resulting in deterioration of X-ray CT image quality.

SUMMARY OF THE INVENTION

The present invent on has been made in an attempt to solve the above-described various problems, and therefore an object is to provide a high speed data acquisition circuit for obtaining X-ray CT image data.

Another object of the present invention is to provide an X-ray CT managing apparatus capable of achieving better image quality.

A still further object of the present invention is to provide a multislice type X-ray CT imaging system with a high density of X-ray detecting channels.

To achieve the above described objects and other features of the present invention, an X-ray CT (computerized tomographic) imaging system (100:200:300) is provided, comprising:

a plurality of X-ray detectors ($CH_1$:$CH_n$:5) for detecting an X-ray penetrated from a biological body (2) under medical examination to produce a plurality of X-ray image signals;

a plurality of A/D (analog to-digital) converting units ($22_1$:$22_n$:$24_1$:$24_n$) connected to the X-ray detectors ($CH_1$:$CH_n$:5), for converting the plurality of X-ray image signals into a plurality of X-ray image data;

an X-ray image reconstruction unit (30) coupled via a digital data bus (24) to the plurality of A/D converting units ($22_1$:$22_n$:$24_1$:$24_N$), for processing said plurality of X-ray image data so as to reconstruct a computerized tomograph1c image of the biological body (2) under medical examination; and, a controlling unit (35:36) for controlling the plurality of A/D converting units ($22_1$:$22_n$:$24_1$:$24_n$) in such a manner that the plural X-ray image data are sequentially outputted from the plural A/D converting means ($22_1$:$22_n$:$24_1$:$24_n$) via the digital data bus (24) to the X-ray image reconstruction unit (30).

Furthermore, according to the present invention, a multislice type X-ray CT (computerized tomographic) imaging system is provided comprising:

an X-ray source (1) for generating an X-ray (4);

an X-ray image data acquisition unit (60) formed on a single substrate (65), for acquiring X-ray image data on a biological body (2) under medical examination by receiving the X-ray (4);

an image reconstruction unit (30) for processing the X-ray image data acquired by the X-ray image data acquisition unit (60) to obtain CT (computerized tomographic) images of multislice portions of the biological body (2) under medical examination; and, a display unit for displaying the CT images of the multislice portions.

Preferably, the above described X-ray image data acquisition unit includes:

a plurality of X-ray signal channels each having scintillators ($SC_{11}$:$SC_{21}$) and photodiodes ($PD_{11}$,$PD_{21}$) arranged in relation with at least two slice portions of the biological body (2), for detecting the X-ray (4) generated from the X-ray source (1) to produce X-ray image signals; and, a plurality of A/D (analog to-digital) converter chips (64) fabricated with the X-ray signal channels on a single substrate (65), for A/D converting the X-ray image signals into the corresponding X-ray image data.

BRIEF DESCRIPTION OF THE DRAWINGS

For a better understanding of the present invention, reference is made to the following descriptions in conjunction with the accompanying drawings, in which.

DETAILED DESCRIPTION OF PREFERRED EMBODIMENTS

Entire Arrangement of First Data Acquisition Circuitry

Figure 3:
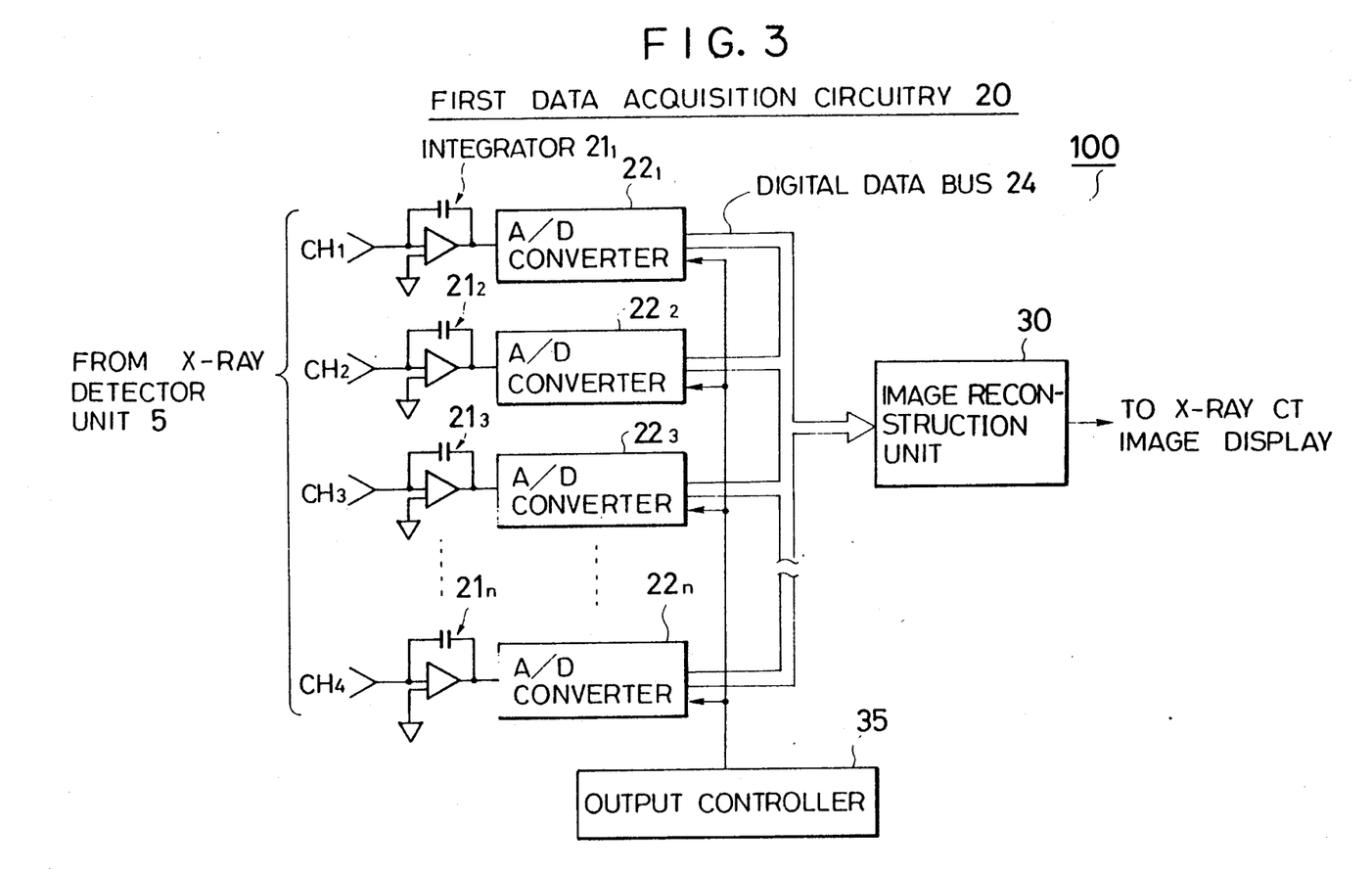
FIG. 3 is a schematic block diagram for showing major circuitry 20 of an X-ray CT image data acquisition unit according to a first preferred embodiment of the present invention.

Referring now to FIG. 3, there is provided an overall arrangement of an X-ray image data acquisition circuit 20 employed in an X-ray CT (computerized tomographic) imaging apparatus 100 according to a first preferred embodiment of the present invention.

For the sake of simplicity, the peripheral arrangement of the first X-ray CT imaging apparatus 100, such as the X-ray detector unit 5 and the X-ray tube 1, has been omitted. Therefore, FIG. 3 shows only a major circuit portion of the first X-ray imaging apparatus 100, i.e., the first X-ray image data acquisition circuitry 20.

In the first X-ray image data acquisition circuitry 20, there are provided "n" ("n" being an arbitrary integer greater than 1) signal channels. Each of these signal channels is constructed of, for instance, the X-ray detector $CH_1$, an integrator $21_1$, an A/D converter unit $22_1$ and an image reconstruction unit 30. The respective A/D converter units $22_1$ to $22_n$ are controlled by an output control unit 35 in such a manner that the X-ray image data derived from the corresponding A/D converter units $22_1$ to $22_n$ is sequentially transferred via the digital data bus 24 to the image reconstruction unit 30 (as will be discussed in more detail below).

Internal Arrangement of A/D Converter Unit

Figure 4:
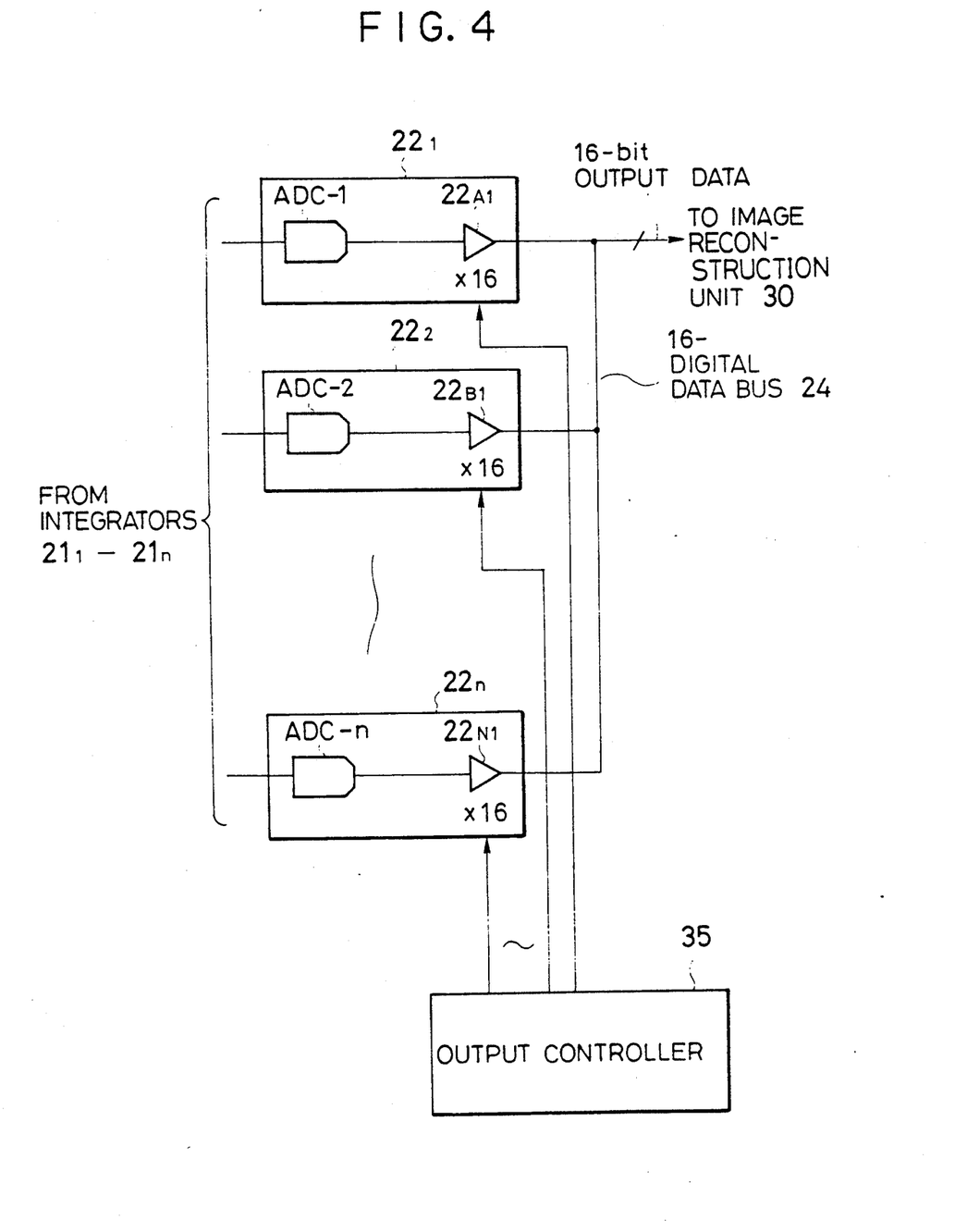
FIG. 4 is a circuit arrangement of the buffer type A/D converter units employed in the first data acquisition circuitry 20 shown in FIG. 3.

FIG. 4 represents an internal arrangement of the above-described A/D converter units $22_1$ to $22_n$. As seen from FIG. 4, 16 buffer circuits $22A_1$, $22B_1$, - - -, $22N_1$ (only one buffer circuit s shown in each unit) are employed in the respective A/D converter units $22_1$, $22_2$, - - -, $22_n$. To these buffer circuits $22A_1$, $22B_1$, - - -, $22N_1$, control signals are sequentially supplied from the output control unit 35 in such a way that the bits of parallel image data are successively outputted from the corresponding buffer circuits, e.g., $22A_1$ to $22A_{16}$ (not shown in detail), and thereafter transferred via the 16-digital data bus 24 to the image reconstruction unit 30 (see FIG. 3).

Overall Operation of First Data Acquisition Circuitry

Referring back to the circuit arrangement of the first X-ray CT imaging apparatus 100, an overall operation thereof will now be described.

While X-rays are emitted from the X-ray tube 1 and then received by The X-ray detectors $CH_1$ to $CH_n$ of the detector unit 5 after penetrating through a selected slice portion of the biological body 2 under medical examination, X-ray image signals are produced from the X-ray detectors $CH_1$ to $CH_n$. These X-ray image signals are first integrated in the respective integrators $21_1$ to $21_n$ and secondly A/D-converged into digital X-ray image data in the respective A/D converters $22_1$ to $22_n$. Thereafter, the digital X-ray image data, for instance, 16-bits of parallel image data arc buffered in the 16 buffer circuits $22A_1$ to $22A_{16}$ in the first A/D converter unit $22_1$.

In response to a first control signal derived from the output control unit 35, shown in FIG. 4, a first set of 16-bits of parallel image data are outputted from 16 buffer circuits $22A_1$ to $22A_{16}$, and then transferred via the digital data bus 24 to the image reconstruction unit 30. Similarly, upon receipt of a second control signal supplied from the output control unit 35, a second set of 16-bits of parallel image data are outputted from 16 buffer circuits $22B_1$ to $22B_{16}$, and thereafter transferred via the digital data bus 24 to the image reconstruction unit 30. Finally, in response to a last control signal outputted from the output control unit 35, a last set of 16-bits of X-ray image data are outputted from the 16 buffer circuits $22N_1$ to $22N_{16}$ and then are transferred via the digital data bus 24 to the image reconstruction unit 30.

As a result, the X-ray image data is processed so as to reconstruct an X-ray CT (computerized tomographic) image of the above described slice portion of the biological body 2 under medical examination. Therefore, the X-ray CT images of the biological body 2 are monitored by a display unit (not shown).

In accordance with the first X-ray CT imaging apparatus 100 equipped with the first data acquisition circuitry 20, since the multiplexer employed in the conventional X-ray image data acquisition circuitry is no longer required, such switching set-up time is no longer needed and thus the image data acquisition time can be considerably shortened, as compared with the conventional image data accusation time.

Arrangement of Second Data Acquisition Circuitry

Figure 5:
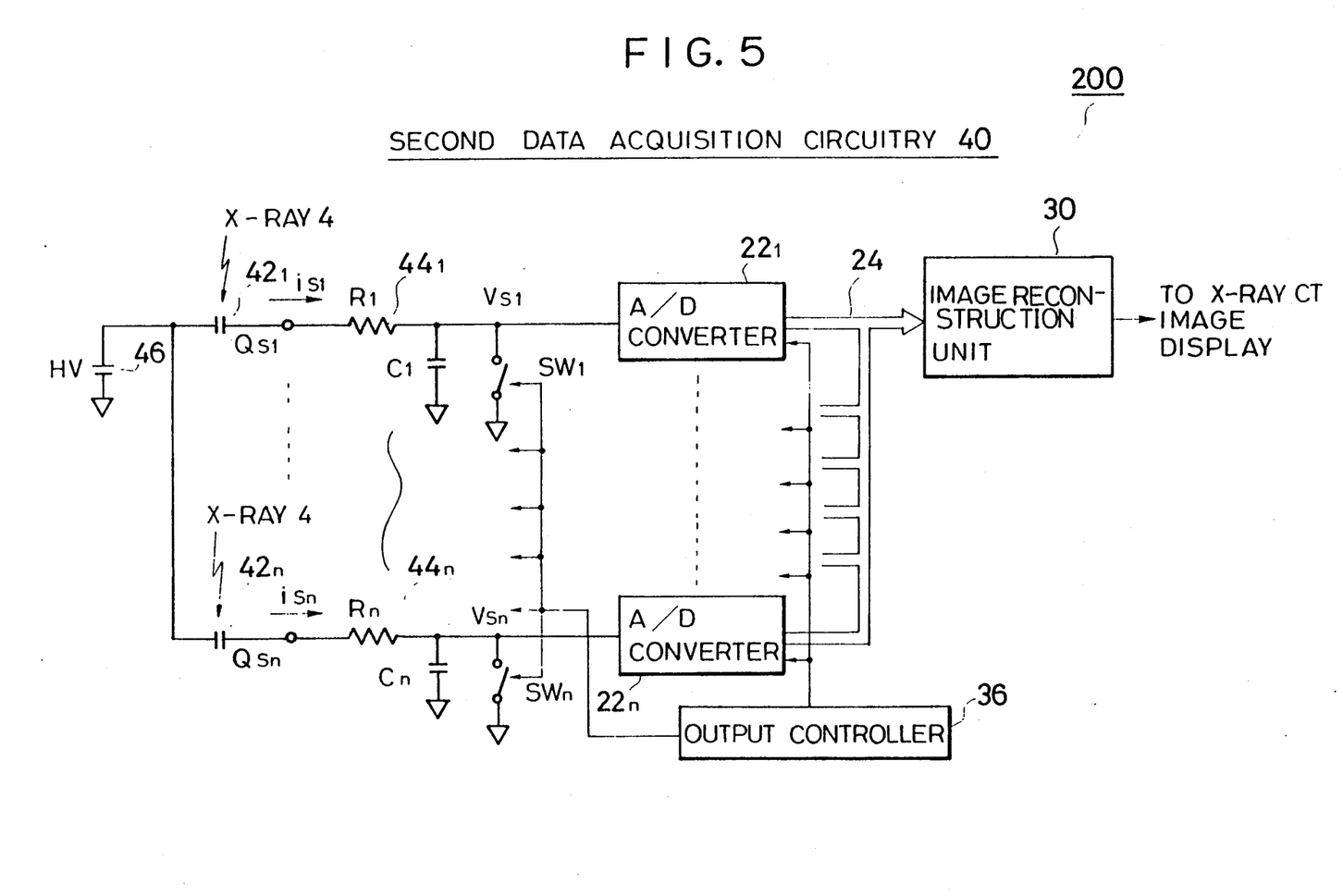
FIG. 5 is a schematic block diagram for showing an overall arrangement of data acquisition circuitry 40 according to a second preferred embodiment of the present invention.

In FIG. 5, there is shown an entire arrangement of an X-ray CT managing apparatus 200 employing X-ray image data acquisition circuitry 40, according to a second preferred embodiment of the present invention.

In the beyond X-ray image data acquisition circuitry 40, "n" pieces of X-ray detectors $42_1$ to $42_n$ ("n" being an arbitrary integer greater than 1) are employed. The X-ray detectors $42_1$ to $42_n$ are ionization type Xe (Xenon) detectors having high impedances. These X-ray detectors $42_1$ to $42_n$ are connected via a resistor R1/capacitor network $44_1$–$44_n$ to the A/D converter units $22_1$–$22_n$. Also, "n" pieces of the X-ray detectors $42_1$ to $42_n$ are commonly connected to a positive terminal of a high-voltage source 46, a negative terminal of which is grounded. Similarly "n" pieces of switches $SW_1$ to $SW_n$ are connected parallel to the capacitors $C_1$ to $C_n$. One end of each capacitor $C_1$, - - -, $C_n$ is connected to the corresponding resistor $R_1$, - - -, $R_n$ and the other end of each capacitor $C_1$, - - -, $C_n$ is grounded.

On the other hand, the outputs of the A/D converter units $22_1$ to $22_n$ are connected via the digital data bus 24 to the image reconstruction unit 30. An output control unit 35 is connected to these A/D converter units $22_1$ to $22_n$ in a similar manner to that of the first image data acquisition circuitry 20, and also to the switches $SW_1$ to $SW_n$ for controlling the switching operations thereof.

Operation of Second Data Acquisition Circuitry

The overall operation of the second X-ray image data acquisition circuitry 40 shown in FIG. 5 will now be described with reference to a signal waveform chart represented in FIG. 6.

It should be noted that since the X-ray signal detection and A/D conversion performed in the first signal processing channel are in principle identical to those of the other signal channels, only the operations of this first signal channel will now be explained for the sake of simplicity.

Figure 6A:
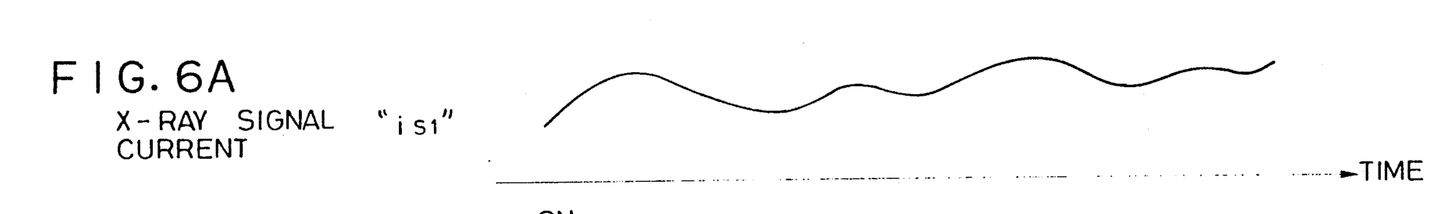
FIGS. 6A to 6E are waveform charts for representing operations of the second data acquisition circuitry 40.
Figure 6B:
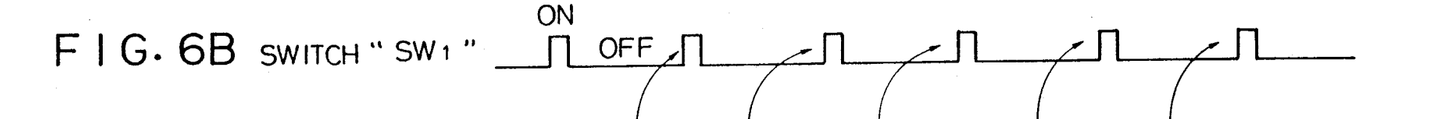
Figure 6C:
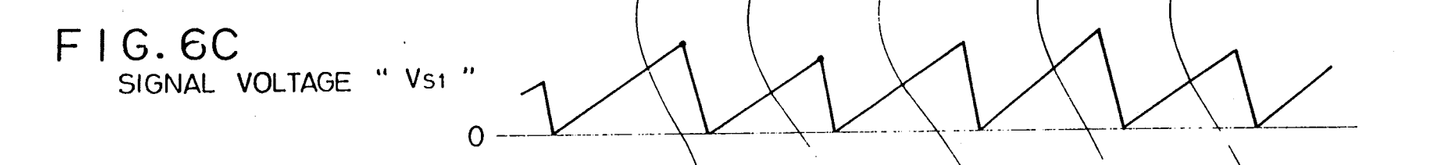

In the first X-ray image data acquisition circuitry 40 of the X-ray CT imaging apparatus 200, a first signal electron charge "$Q_{s1}$" generated between the electrodes of the first Xe detector $42_1$ becomes a first signal current "$i_{s1}$" (see FIG. 6A) which will then be charged into the first signal storage capacitor $C_1$. As a result, the first signal electron charge "$Q_{s1}$" is converted into a first voltage signal "$V_{ss1}$" (see FIG. 6C) as defined as follows:

$$V_{s1} = Q_{s1}/C_1 \qquad (1).$$

Figure 6D:
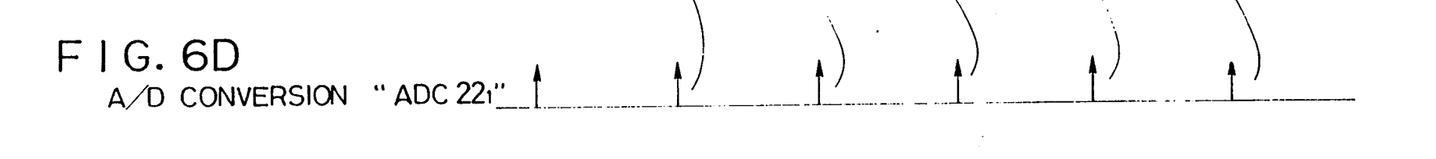

Thereafter, the first voltage signal "$V_{s1}$" (FIG. 6C) is applied to the first A/D converter unit $22_1$ so as to be A/D-converted into corresponding first X-ray image data (see FIG. 6D). The first X-ray image data is supplied at a preselected timing (see FIG. 6D) via the digital data bus 24 to the image reconstruction unit 30 for the image reconstruction purpose under control of the output control unit 36. After such an A/D converting operation of the first X-ray image signal has been accomplished, the first switch $SW_1$ is closed ("ON" state of FIG. 6B) in order to reset (discharge) the electron charge "$Q_{s1}$" stored in the first storage capacitor "$C_1$". Thus, the first signal voltage "$V_{s1}$" is decreased as shown in FIG. 6C. When such a charge resetting operation is completed, the first switch "$SW_1$" is opened ("OFF" state of FIG. 6C) and the subsequent signal charging operation by the first storage capacitor $C_1$ is commenced.

Figure 6E:
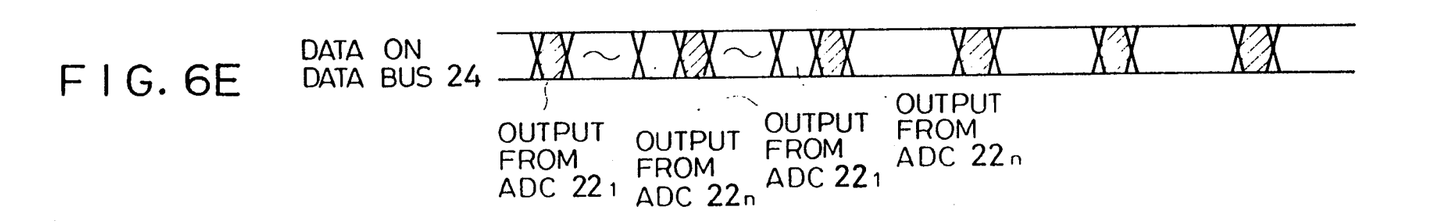

Since the above-described X-ray detecting operation and the A/D converting operation are similarly performed in the remaining signal processing channels, the X-ray image data are sequentially outputted from the respective A/D converter units $22_1$ to $22_n$ via the digital data bus 24 to the image reconstruction unit 30 as represented in FIG. 6E.

Arrangement of Third Data Acquisition Circuitry

Figure 7:
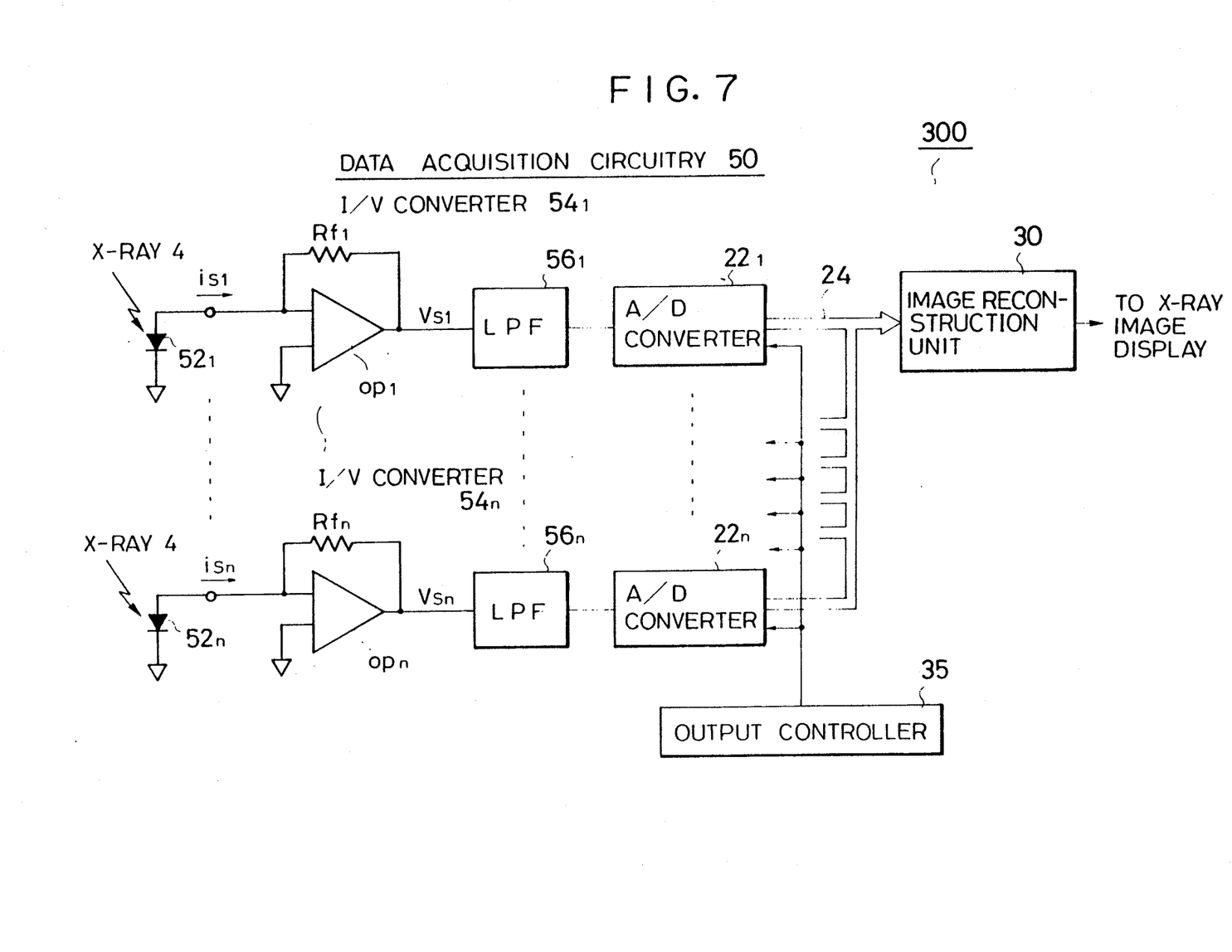
FIG. 7 is a schematic block diagram for representing an overall arrangement of data acquisition circuitry 50 according to a third preferred embodiment of the present invention.

Referring now to FIG. 7, an arrangement of an X-ray CT imaging apparatus 300 employing an X-ray image data acquisition circuitry 50, according to a third preferred embodiment of the present invention, will be described.

In the third X-ray image data acquisition circuitry 50, "n" pieces of solid state X-ray detectors $52_1$ to $52_n$ are employed. Each of the solid-state X-ray detectors $52_1$ to $52_n$ is constructed of a scintillator and a photodiode (not shown in detail). The solid-state X-ray detectors $52_1$ to $52_n$ are connected to I/V converting amplifiers $54_1$ to $54_n$ respectively which each is constructed of a feedback resistor $R_{f1}$, - - -, $R_{fn}$ and an operational amplifier $OP_1$, - - -, $OP_n$. The I/V converting amplifiers $54_1$ to $54_n$ are connected via low-pass filters $56_1$ to $56_n$ to the A/D converter units $22_1$ to $22_n$. Similar to the first and second data acquisition circuitry 20 and 40, the A/D converter units $22_1$ to $22_n$ are connected via the digital data bus 24 to the image reconstruction unit 30, and also are connected to the output control unit 35.

Operation of Third Data Acquisition Circuitry

Upon receipt of the X-ray 4 transmitted through the biological body 2 from the X-ray tube 1, the solid-state X-ray detectors $52_1$ to $52_n$ produce current signals in such a manner that photo signals generated from the scintilators are converted into the current signals by the photodiodes. A first current signal "$i_{s1}$" produced from the first stator X-ray detector $52_1$ is converted into a first voltage signal "$V_{s1}$" by the first I/V converting amplifier $54_1$ in accordance with the following equation (2):

$$V_{s1} = -R_{f1} \times i_{s1} \qquad (2).$$

Then, this voltage signal "$V_{s1}$" is supplied to the first low pass filter $56_1$, so that only an X-ray image signal having a necessary frequency bandwidth is derived from this low-pass filter $56_1$. Subsequently, this filtered X-ray image signal is A/D-converted by the first A/D converter unit $22_1$. The resultant X-ray image data from this first A/D converter unit $22_1$ is supplied at a predetermined timing via the digital data bus 24 to the image reconstruction unit 30.

The above described X-ray detecting operation and X-ray image signal processing operation performed in the first signal processing channel are carried out in a similar manner n the remaining signal processing channels. Accordingly, no further explanation thereof is made in this specification.

It should be noted that although the low-pass filters $56_1$ to $56_n$ are separately employed in the third X-ray image data acquisition circuitry 50, these low-pass filters may be alternatively combined with the I/V converting amplifiers $54_1$ to $54_n$, or digital filters may be employed in the A/D converter units $22_1$ to $22_n$ instead of the low-pass filers $56_1$ to $56_n$.

Multislice Type X-Ray CT Imaging Apparatus

Figure 8A:
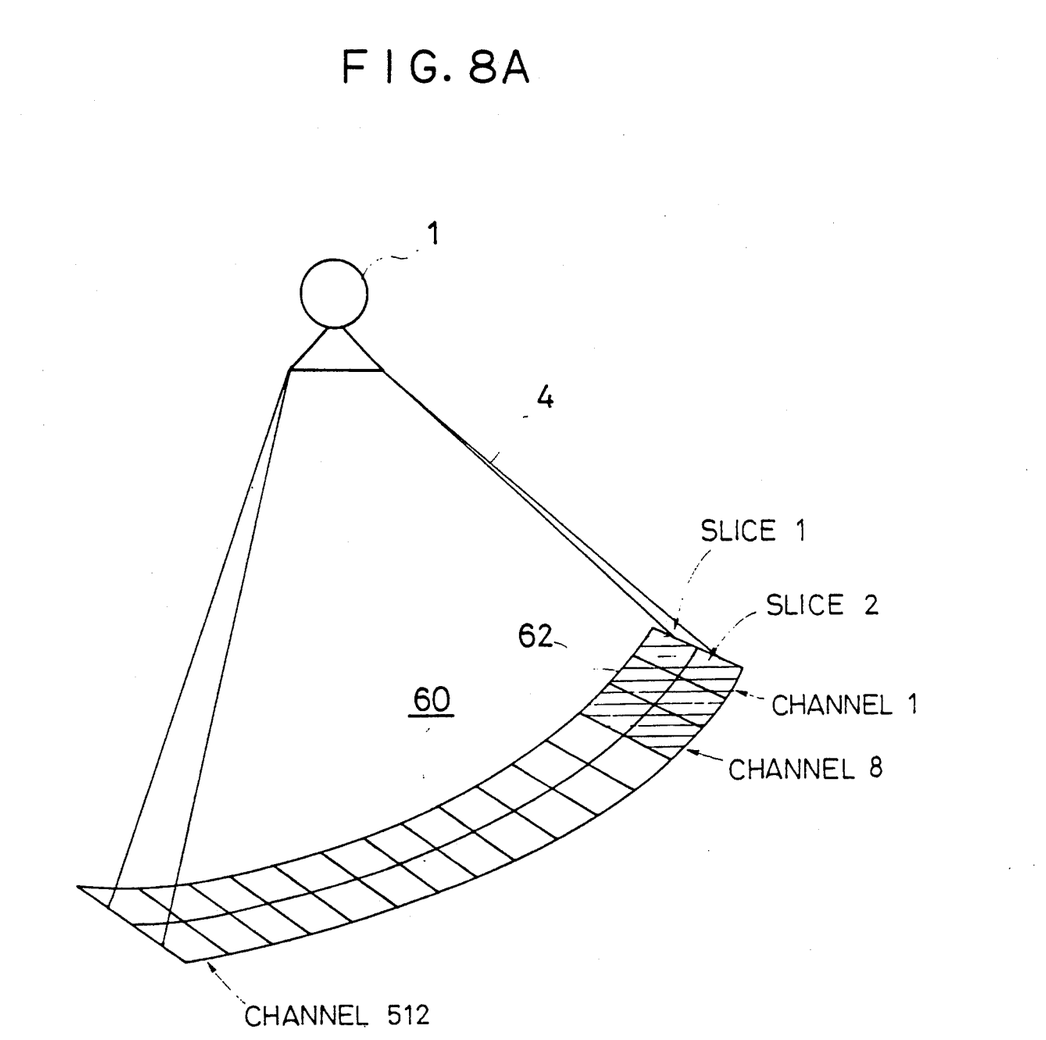
FIG. 8A illustrates a multislice type X-ray CT imaging apparatus employing a data acquisition unit according to a fourth preferred embodiment of the present invention.
Figure 8B:
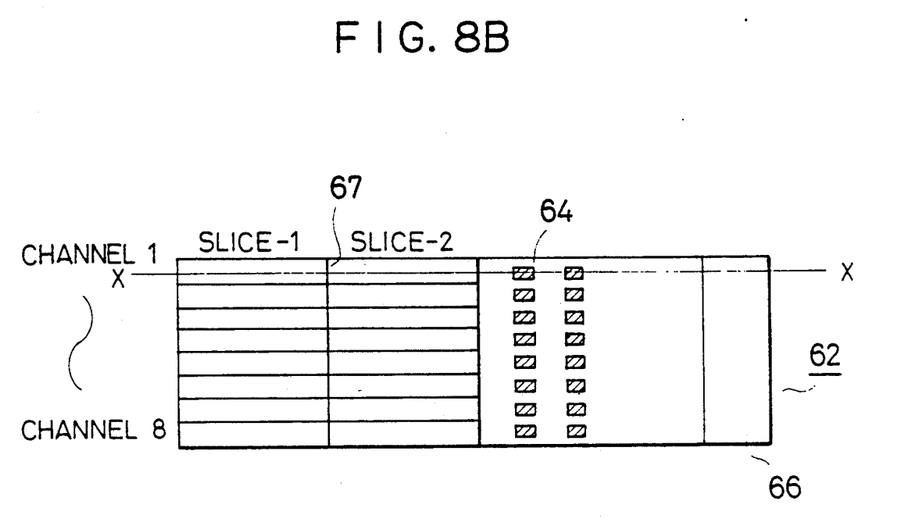
FIG. 8B is a pan view of the X-ray detecting unit portion 62 shown in FIG. 8A.
Figure 8C:
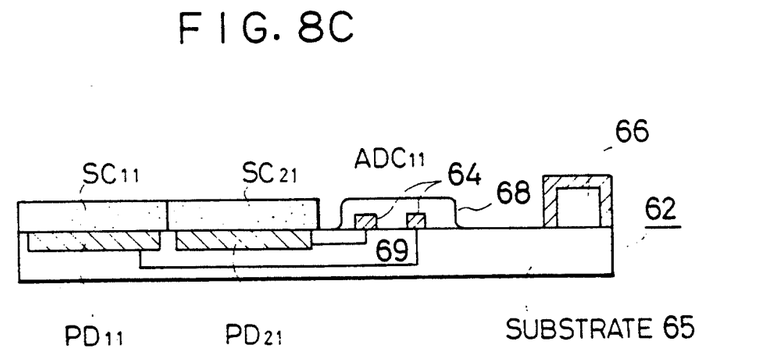
FIG. 8C s a cross sectional view of the X-ray detecting unit portion 62, taken along the line X-X shown in FIG. 8B; and, FIG. 9 is a schematic circuit diagram of a daisy type A/D converter unit.

In FIGS. 8A-8C, there is shown a multislice type X-ray CT imaging apparatus employing another X-ray image data acquisition unit 60, according to a fourth preferred embodiment of the present invention.

As seen from FIG. 8A, a first slice "1" and a second slice "2" are arranged, each of which is constructed of 512 signal channels. A portion 62 of the fourth X-ray image data acquisition unit 60 is illustrated in FIG. 8B. Ths fourth data acquisition unit portion 62 includes the signal channel 1 to the signal channel 8 belonging to the first and second slices; A/D converter chips 64 and an output connector 66. Although conductive patterns are actually formed on a major surface of a substrate 65 (see FIG. 8C), these patterns are not illustrated in FIG. 8B.

As represented in FIG. 8B, the first slice "1" is separated by way of a separator 67 from the second slice "2". Then, the data acquisition unit portion 62 has a combination of X-ray detecting cells (8 channels×2 slices).

FIG. 8C is a cross sectional view of the data acquisition unit portion 62, taken along a line X—X of FIG. 8B. In FIG. 8C, two photodiodes $PD_{11}$ and $PD_{21}$ are formed on the ceramics substrate 65, and two scintillators $SC_{11}$ and $SC_{21}$ are furthermore formed on the first and second photodiodes $PD_{11}$ and $PD_{21}$. On the other hand, A/D converter chips 64 are similarly formed on the ceramics substrate 65, which are then sealed by a plastic seal 68. It should be noted that although conductive patterns 69 are shown in the cross sectional view of FIG. 8C, these patterns 69 are practically formed on the surface of this substrate 65 (not shown in FIG. 8B).

The multislice type X-ray CT imaging apparatus employing the fourth X-ray image data acquisition unit 60 has such a particular feature that the A/D converter chips 64 corresponding to the photodiodes $PD_{11}$, $PD_{21}$ can be packaged on a single substrate 65. That is to say, high density of the X-ray image data acquisition unit can be achieved.

Moreover, when both of the scintillators and photodiodes are furthermore subdivided, this X-ray detector unit may be constructed as a two-dimensional X-ray detector.

Modifications

The present invention is not limited to the above-described peeferred embodiments, but may be modified without departing from the technical scope and spirit of the present invention.

Figure 9:
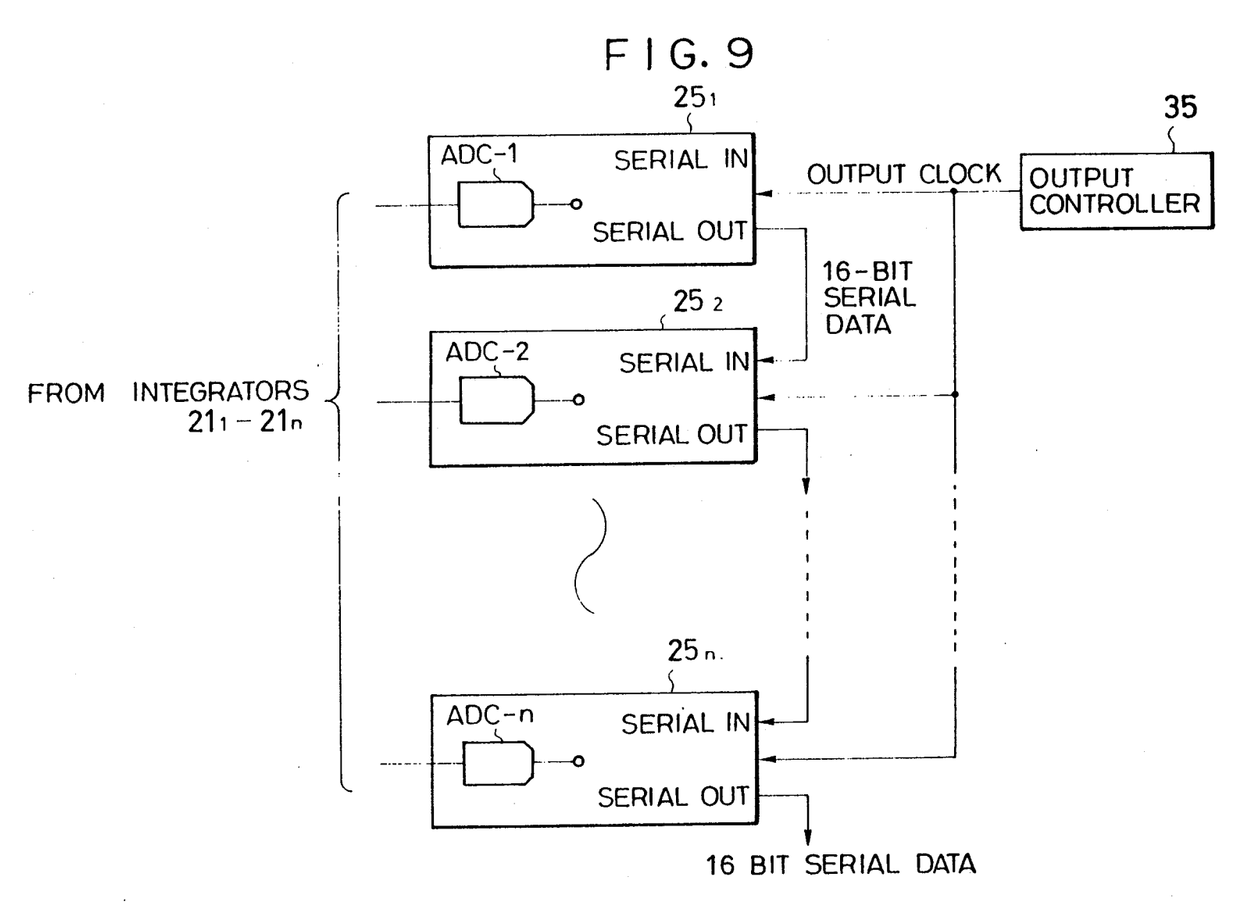

For instance, although the 16-bits of parallel image data are derived from the respective buffer circuits $22A_1$ to $22N_1$ employed in the A/D converter units $22_1$ to $22_n$ of the first image data acquisition circuitry 20 shown in FIG. 4, instead of these buffer type A/D converter units $22_1$ to $22_n$, so-called "daisy chain" type A/D converters $25_a$ to $25_n$ as shown in FIG. 9 may be employed. In such first modified A/D converter units $25_1$ to $25_n$, for instance, 16 bits of serial image data are successively derived from the serial outputs of the first to "n"-th A/D converter units $25_1$ to $25_n$ and then supplied to the serial inputs thereof. Precisely speaking, in response to the output clock from the output control unit 35, the first 16 bits of serial image data are successively derived from the serial output of the first A/D converter unit $25_1$ in units of 1 bit, and then inputted into the serial input of the second A/D converter unit $25_2$ in units of 1 bit, similarly. In other words, the 16 bits of image data are successively shifted by 1 bit, whereby 16 bits of image data in serial data form are outputted from the n-th A/D converter unit $25_n$ under such a condition that a MSB of the data is first outputted and a LSB of the data is lastly outputted from the A/D converter unit $25_n$.

In accordance with the above-explained daisy chain type A/D converter unit 25, the total number of digital signal lines (data bus) can be considerably reduced, as compared with that of the buffer type A/D converter unit 22.

Also, the A/D converter chips 64 shown in FIG. 8B and 8C may be substituted by oversampling type A/D converter chips (not shown). Such oversampling type A/D converter chips per se are known in the technical field, and have a particular advantage that dimensions of A/D converting elements are made very small, and high-speed A/D converting operation can be achieved at low cost.

While the present invention has been described in detail, X-ray image data can be acquired at higher speeds than in the conventional data acquisition, and also the data transfer operation from the A/D converter units to the image reconstruction unit is not adversely influenced by noise. Since the high-speed data acquisition is realized and thus a large quantity of X-ray detecting elements can be packaged within a limited detector region, multislice X-ray CT imaging systems with a high density of detector elements may be constructed.

What is claimed is:

1. An X-ray CT (computerized tomographic) imaging system comprising;
   an X-ray source;
   a plurality of X-ray detectors arranged to detect X-rays emitted by said X-ray source and penetrating through a biological body under medical examination to produce a plurality of analog X-ray image signals;
   a plurality of A/D (analog-to-digital) converters each connected to a corresponding one of said X-ray detectors to convert said plurality of analog X-ray image signals into corresponding digital X-ray image data;
   means for integrally rotating said X-ray source, said X-ray detectors, and said A/D converters around said biological body;
   a digital data bus connected to said plurality of A/D converters;
   X-ray image reconstruction means coupled via said digital data bus to said plurality of A/D converters for processing said digital X-ray image data so as to reconstruct a computerized tomographic image of said biological body, said X-ray image reconstruction means being stationary with respect to said X-ray source, said X-ray detectors, and said A/D converters;
   controlling means for controlling said plurality of A/D converters in such a manner that said digital X-ray image data is sequentially outputted from said plurality of A/D converters via said digital data bus to said X-ray image reconstruction means.

2. An X-ray CT imaging system as claimed in claim 1, further comprising:
   a plurality of integrators interposed between said plurality of X-ray detectors and said plurality of A/D converters to integrate said plurality of analog X-ray image signals.

3. An X-ray CT imaging system as claimed in claim 2, wherein each of said integrators includes an operational amplifier and a capacitor connected between an output and an input of said operational amplifier.

4. An X-ray CT imaging system as claimed in claim 2, wherein each of said A/D converters includes:
a buffer circuit arranged to receive said digital X-ray image data and to output said digital X-ray image data via said digital data bus to said image reconstruction means under control of said controlling means.

5. An X-ray CT imaging system as claimed in claim 4, wherein each of said buffer circuits outputs said digital X-ray image data as 16 parallel bits of digital X-ray image data under control of said controlling means.

6. An X-ray CT imaging system as claimed in claim 1, wherein said plurality of X-ray detectors include ionization type xenon detectors commonly biased by a high-voltage source.

7. An X-ray CT imaging system as claimed in claim 6, further comprising:
a plurality of signal storage capacitors coupled to respective ones of said ionization type xenon detectors to store signal electron charges produced by said ionization type xenon detectors; and
a plurality of switches each connected in parallel to a respective one of said signal storage capacitors to charge and discharge the signal electron charges into and from, respectively, said signal storage capacitors under control of said controlling means.

8. An X-ray CT imaging system as claimed in claim 7, wherein each of said A/D converters includes:
a buffer circuit arranged to receive said digital X-ray image data and to output said digital X-ray image data via said digital data bus to said image reconstruction means under control of said controlling means.

9. An X-ray CT imaging system as claimed in claim 8, wherein each of said buffer circuits outputs said digital X-ray image data as 16 parallel bits of digital X-ray image data under control of said controlling means.

10. An X-ray CT imaging system as claimed in claim 1, wherein said plurality of X-ray detectors include a plurality of solid-state X-ray detectors.

11. An X-ray CT imaging system as claimed in claim 10, wherein each of said solid-state X-ray detectors includes a scintillator and a photodiode, said scintillator emitting an optical signal upon receipt of at least one of said X-rays and said photodiode producing a current signal upon receipt of said optical signal.

12. An X-ray CT imaging system as claimed in claim 11, further comprising:
a plurality of current-to-voltage converters arranged to receive said current signals and convert said current signals into corresponding voltage signals; and
a plurality of low-pass filters arranged to receive said voltage signals and pass low frequency signal components contained in said voltage signals.

13. An X-ray CT imaging system as claimed in claim 12, wherein each of said A/D converters includes:
a buffer circuit arranged to receive said digital X-ray image data and to output said digital X-ray image data via said digital data bus to said image reconstruction unit under control of said controlling means.

14. An X-ray CT imaging system as claimed in claim 13, wherein each of said buffer circuits outputs said digital X-ray image data as 16 parallel bits of digital X-ray image data under control of said controlling means.

15. An X-ray CT imaging system as claimed in claim 1, wherein each of said plurality of A/D converters includes:
a serial data input and a serial data output, whereby said analog X-ray image signals are successively inputted to said serial data inputs and said digital X-ray image data is outputted from said serial data outputs in a serial data form.

16. A multislice type X-ray of (computerized tomographic) imaging system comprising;
an X-ray source;
X-ray image data acquisition means formed on a single substrate for acquiring digital X-ray image data on a biological body under medical examination by receiving X-rays generated by said X-ray source, said X-ray image data acquisition means including
a plurality of X-ray signal channels each having scintillators and photodiodes arranged in relation with at least two slice portions of said biological body to detect said X-rays generated by said X-ray source and produce analog X-ray image signals therefrom, and
a plurality of A/D (analog-to-digital) converter chips fabricated with said X-ray signal channels and said single substrate to convert said analog X-ray image signals into said corresponding digital X-ray image data;
means for integrally rotating said X-ray source and said X-ray image data acquisition means around said biological body;
image reconstruction means for processing said digital X-ray image data acquired by said X-ray image data acquisition means to obtain CT (computerized tomographic) images of multislice portions of said biological body, said image reconstruction means being stationary with respect to said X-ray source and said X-ray image data acquisition means; and
display means for displaying said CT images.

17. A multislice type X-ray CT imaging system as claimed in claim 16, wherein said plurality of X-ray signal channels are electrically connected to said plurality of A/D converter chips via conductive patterns formed on said single substrate.

18. An X-ray CT imaging system as claimed in claim 16, wherein sad plurality of X-ray signal channels include at least two sets of 512 X-ray signal channels.

19. A multislice type X-ray CT imaging system as claimed in claim 18, wherein said plurality of A/D converter chips are sealed by an electrically insulating material, and a data output connector is mounted on said single substrate so as to output said digital X-ray image data acquired by said X-ray image data acquisition means.

* * * * *